Dec. 24, 1957          G. F. SCHROEDER           2,817,800
       SYSTEM FOR ELIMINATING TIME REFERENCE FOR
         SYNCHRONOUS MOTORS USED IN CONJUNCTION
                WITH MECHANICAL INTEGRATORS
                   Filed April 17, 1956
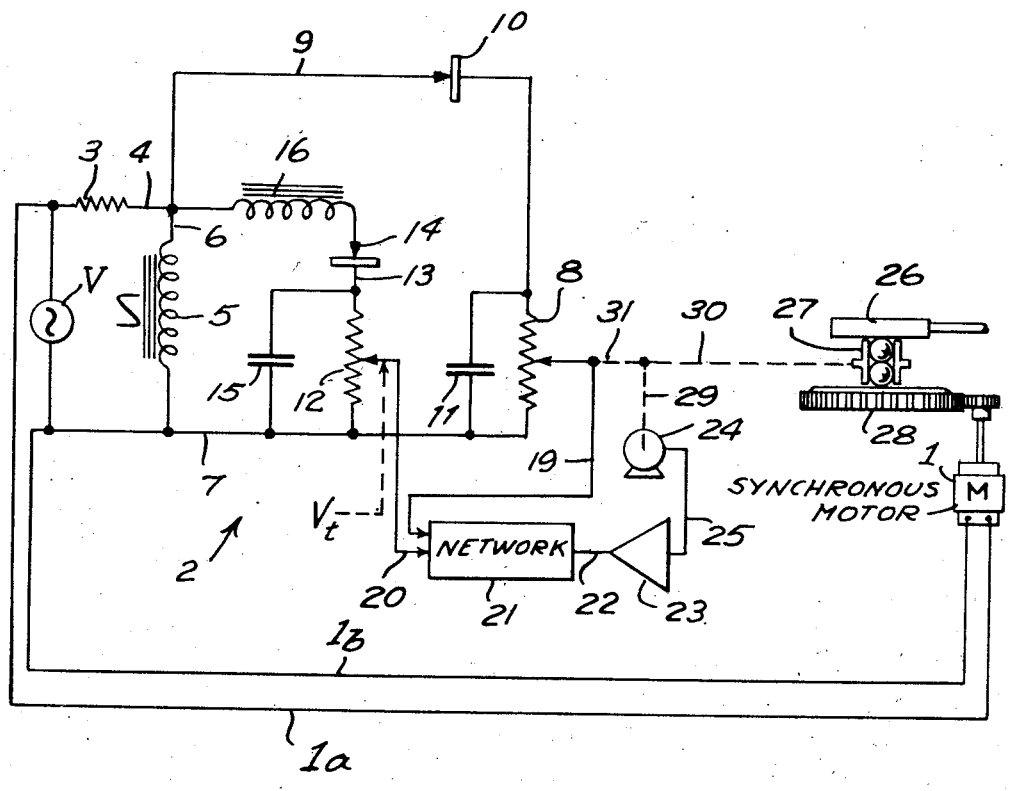
Inventor
GEORGE F. SCHROEDER
By Victor N. Borst
                Attorney

United States Patent Office 2,817,800
Patented Dec. 24, 1957

2,817,800

SYSTEM FOR ELIMINATING TIME REFERENCE FOR SYNCHRONOUS MOTORS USED IN CONJUNCTION WITH MECHANICAL INTEGRATORS

George F. Schroeder, Paterson, N. J., assignor to Sperry Rand Corporation, Ford Instrument Company Division, Long Island City, N. Y., a corporation of Delaware Application April 17, 1956, Serial No. 578,713

5 Claims. (Cl. 318—8)

This invention relates to a system for operating mechanical integrators employing synchronous motor drive and particularly to means for compensating for undesired frequency changes in the voltage source energizing the synchronous motor which drives the disc of a variable speed device.

Previous methods of controlling the disc speed of an integrator in order to produce an accurate integration required a mechanical source whose speed was more accurate than the degree at which the integration was to be performed. As examples, such methods included controlling the frequency of the voltage source itself, using a mechanical clock-type escapement to control the speed of D. C. or A. C. motors and adding connective shaft positions into the mechanical time line by means of a servo.

In general, this invention contemplates the provision of a magnetic amplifier reference device powered by the same source that energizes the synchronous motor which drives the integrator disc. The speed of synchronous motors is dependent on the frequency of the impressed voltage and generally independent of its magnitude. The referencing device generates a fluctuating voltage proportionate to the frequency of this impressed voltage, which, in conjunction with a constant voltage, is employed to position the carriage of the integrator so as to compensate for the change in disc speed due to the frequency change of the voltage supply.

One object of the invention therefore is to provide a device for adjusting the position of the carriage of an integrator so as to compensate for irregularities in the speed of the disc driving mechanism.

Another object is to provide an error frequency compensated integrator system which operates without vacuum tubes and other electronic devices which impose limitations on the reliability and durability of units of this type.

A particular advantage of the invention is to reduce the amount of control power needed by an integrating system to make it insensitive to frequency changes.

Other objects and advantages of the invention may be apparent on reading the detailed description in connection with the accompanying figure which illustrates schematically one mechanization.

A voltage source V supplies the power to a synchronous motor 1 through lines 1a and 1b and the referencing device 2 by a circuitry described below. A resistor 3 having a constant impedance is provided in lead 4 which connects to one side of the source. A saturable inductor 5 is provided in branch 6 which is placed across the source by virtue of its connection to the lead 4 and lead 7 on the other side of the source. The inductor is designed so that its core is always driven to saturation for the range of variation in the amplitude of the supply voltage V.

The voltage drop in the inductor 5 which is proportional to frequency and insensitive to the supply voltage V, is duplicated in potentiometer 8 which is connected across the inductor 5 by means of the lead 7 and a lead 9. A half wave rectifier 10 in the lead 9 provides a D.-C. voltage across the potentiometer 8. A capacitor 11 shunts the potentiometer 8 to provide a low impedance to the high frequency components of the line current.

A second potentiometer 12 is similarly connected across the inductor 5 by means of the lead 7 and a lead 13 in which there is provided a half wave rectifier 14. A capacitor 15 is placed across the potentiometer 12 and an inductor 16 is provided in the lead 13. If the resistance of the potentiometer 12 is small compared to the impedance of the inductor 16, the line current in the branch 13 will be constant and independent of any fluctuations in the amplitude and frequency of the line voltage V. This is due to the fact that both the line voltage supplied by the saturated inductance 5 and the inductive reactance of the inductor 16, which provides most of the line impedance in this section of the device, varies solely with frequency. Accordingly, the ratio of voltage to impedance is fixed and the current is constant. The D.-C. voltage across the potentiometer 12 is therefore constant.

As shown in the figure a servo system is powered by a constant reference voltage and a fluctuating voltage provided by the referencing device. Leads 19 and 20 connect the movable taps of the potentiometers 8 and 12, respectively, to the input side of adding network 21 of the usual resistive type. An output lead 22 connects an amplifier 23 to the output side of the adding network. A servo motor 24 is energized by the amplifier which is connected to the servo motor by lead 25.

A mechanical integrator of the general character shown and described in Patent No. 1,317,915 and having an output roller 26, carriage 27 and disc 28 is operated by the synchronous motor 1 and the referencing device and servo system. The disc 28 is driven by the synchronous motor and the carriage 27 is positioned by the servo motor 24 through armature shaft 29 and driven shaft 30. The output of motor 24 is also connected to the tap for potentiometer 8 by means of feed back shaft 31.

To operate the device the integrator carriage 27 is positioned by the positioning of the tap on the constant referencing potentiometer 12. When the mechanical equivalent of the tapped voltage $V_t$ is represented on the shaft 30, the feed back shaft 31 has moved the center tap for potentiometer 8 to a position corresponding to that of the center tap for the potentiometer 12 and the adding network is zeroed to shut off the servo motor 24. Any fluctuations in the voltage drop across potentiometer 8 corresponding to changes in the frequency of the supply voltage are compared in the network with the constant reference voltage supplied by the potentiometer 12 and the carriage is oriented to offset the change in speed of the disc driven by the frequency responsive synchro motor 1. When the frequency increases so as to increase the speed of the disc, the radial offset position of the carriage from the center of the disc is decreased and vice versa. The system is again zeroed when the carriage position has been fully adjusted to compensate for the unwanted change in frequency.

Inasmuch as the amount of energy necessary to excite both potentiometers is small, the referencing device may be extremely small in size and weight with no loss in accuracy.

It is understood that various departures may be effected in the mechanization from that which has been illustrated and described, such modifications being consistent with the scope and principle of the invention as defined in the appended claims.

What is claimed is:

1. An error frequency compensator for a mechanical integrator having a disc and a carriage comprising a source of voltage of variable frequency and an amplitude varying as a function of frequency, a frequency responsive device adapted to drive the disc of said integrator and powered by said source, a referencing device similarly powered by said source, said referencing device being adapted to generate a constant reference voltage and a voltage which varies as a function of the frequency of said source and means connected to said referencing device and to said integrator for comparing and utilizing the said voltages to adjust the position of the carriage of the integrator whereby a change in the frequency of the voltage delivered to the frequency responsive device is compensated for by the adjusted carriage position.

2. An error frequency compensator as claimed in claim 1 wherein the means for adjusting the carriage position includes a closed loop servo system including an adding network.

3. An error frequency compensated integrator system comprising a mechanical integrator having a disc and carriage, a source of voltage of variable frequency and amplitude, a frequency responsive device in driving connection with the disc of said integrator and powered by said source, a referencing device similarly powered by said source, said referencing device being adapted to generate a constant reference voltage and a voltage which varies as a function of the frequency of said source and means connected to said referencing device and to said integrator for comparing and utilizing the said voltages to adjust the position of the carriage of the integrator whereby a change in the frequency of the voltage delivered to the frequency responsive device is compensated for by the adjusted carriage position.

4. An error frequency compensator as claimed in claim 3 wherein the means for adjusting the carriage position includes a closed loop servo system.

5. An error frequency compensator system as claimed in claim 4 wherein the means for comparing the constant reference and the variable voltages is an adding network, the referencing device includes a pair of potentiometers for making said voltages available to the integrator, and the potentiometer for the variable voltage and the said adding network are units forming a portion of the servo system.

No references cited.